Nov. 4, 1941. A. M. HENRY ET AL 2,261,369
FASTENER
Filed Aug. 13, 1940 5 Sheets-Sheet 1

INVENTORS
Augustus M. Henry
Charles Horton
BY
Attorney.

Nov. 4, 1941.    A. M. HENRY ET AL    2,261,369
FASTENER
Filed Aug. 13, 1940    5 Sheets-Sheet 3

INVENTORS
Augustus M. Henry
Charles Horton
BY
Attorney

Nov. 4, 1941.  A. M. HENRY ET AL  2,261,369
FASTENER
Filed Aug. 13, 1940  5 Sheets-Sheet 5

INVENTOR.
Augustus M. Henry
Charles Horton
BY
Augustus M. Henry
Attorney.

Patented Nov. 4, 1941

2,261,369

UNITED STATES PATENT OFFICE 2,261,369

FASTENER

Augustus M. Henry, Brooklyn, N. Y., and
Charles Horton, Ridgefield Park, N. J.

Application August 13, 1940, Serial No. 352,366

22 Claims. (Cl. 85—5)

This invention relates to fasteners, for detachably fastening one part to another, as one plate to an overlapping plate, in aircraft cowling or elsewhere; and, more particularly, the invention aims to provide an improved form of fastener in that class of fasteners having a pair of coacting means one secured to one of said parts and the other passing through both parts and operable by fractional rotation to set up a strong and dependable interlock between said two means.

A very important, but not the only field of usefulness, for this class of fasteners, is that of aircraft construction, as in the assembly or ready disassembly from the exterior of the airplane, at frequent intervals, and usually when no unnecessary time should be lost in disassembly and subsequent reassembly, of the one or more separately removable cowling pieces or cowls for enclosing a motor of the airplane. The fastener of the present invention, to simplify its disclosure, will herein be described in connection with its use for detachably fastening together a removable cowling piece and another part of the sheathing or skin of the airplane after said piece has been placed to have a marginal portion thereof overlap a marginal portion of the said sheathing part.

An object of the invention is to reduce the cost of manufacture of this class of fasteners, and at the same time provide an adequately strong and dependable, and, where desired, a much smaller fastener, than heretofore thought possible.

Previous fasteners of the kind above mentioned have included, as to their two means aforesaid, a resilient member or means secured at the inner side of a plate-like part of the airplane skin over which is to be lapped a cowling piece—said part and said piece being hereinafter called plates—and a stud having a kerfed head and a shank extensible through a hole in one of such plates and through a hole in the other plate matching the hole just mentioned; this stud being then operable in making the joint, first to engage said resilient member, and then, and incidental to fractional rotation of the stud, to coact with said resilient member to lock the fastener closed and at the same time to place the resilient member under sufficient tension to draw the plates tightly together where overlapped.

A heretofore favored form of such fastener has had its resilient member or means in the form of a length of spring wire secured at opposite coiled ends to the inner plate and having an intermediate substantially straight stretch crossing the stud-receiving hole through the inner plate. Consequently, the stud has had to have a tubular shank, this shank has had to be bifurcated along its length all the way from a point near the kerfed head of the stud to the free end of the stud shank, and this bifurcation has had to be established by bayonet joint slots on opposite sides of the shank-shell, with one such slot spirally extending in a direction opposite to the direction of extension of the other slot.

One advantage of the present invention is that a stud which is so costly to fabricate as the one just described is done away with, and there is substituted therefor a solid-shank stud which can be made at trifling cost, because producible by operation of an ordinary screw-machine, or by one or two or very few blows of a riveting machine, acting on a length of round-rod stock being continuously fed therethrough. This advantage is obtained because, instead of including in the fastener a single length of spring wire secured at opposite ends to the inner plate and having an intermediate stretch thereof crossing the hole through said plate, as aforesaid, a resilient means for securement to the inner side of the inner plate is provided which essentially comprises two coacting tong-like claws which are resiliently biased toward each other and away from the plane of the joint to be made, in such manner that they constitute instrumentalities for coaction with easily formed grooves or recesses on the exterior of a solid-shank stud. These grooves or recesses are so shaped that, after insertion of the stud to enter said claws into said grooves, fractional rotation of the stud forces the claws along the length of the grooves to locations where the claws snap to interlock with pocket-like extensions of the grooves, thereby to prevent accidental retrograde turning of the stud and at the same time by placing the resilient members carrying the claws under abnormal tension not relievable except by retrograde turning of the stud, to hold the joint tightly closed.

Other features and advantages of the invention will be pointed out or become apparent hereinafter.

In the accompanying drawings, which in illustration of the invention, show various embodiments thereof as now favored.

Figure 1:
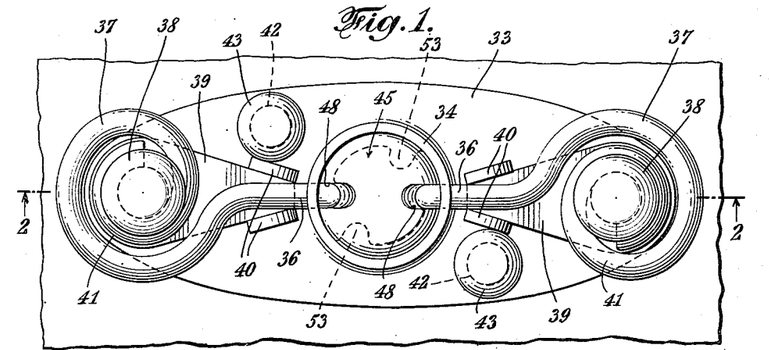
Fig. 1 shows one embodiment, in top plan, that is, looking toward the inner face of the inner plate at the joint, with the stud inserted through the plates of the joint but not yet rotated fractionally to locking position.
Figure 2:
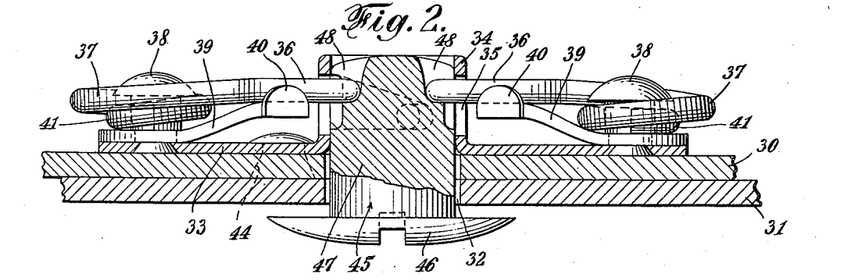
Fig. 2 is a section, taken on the line 2—2 of Fig. 1.
Figure 3:
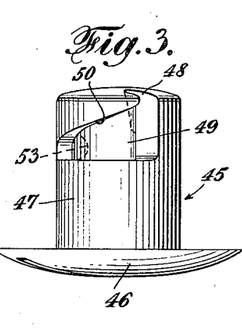
Fig. 3 shows the stud, in side elevation.
Figure 4:
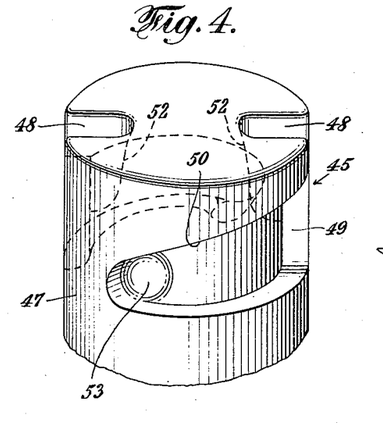
Fig. 4 is an enlarged perspective view of the grooved portion of the solid shank of the stud.

Referring in general to the various embodiments illustrated in the drawings, the relative scales to which they have been drawn have been stated; and in this connection it is pointed out Fig. 1 is drawn to a scale substantially 4 to 1 as regards a fastener practicable for use in the ordinary airplane in attaching the usual cowling.

In all the exemplifying structures shown in the drawings, part of a lapped joint between an inner plate 30 and an outer plate 31 is illustrated.

The fastener of the invention includes a screw-like stud, as one element, and a pair of claws or tongs which, as such pair, constitute the complementary element of the latch-lock means of the fastener. These tongs are mounted on that plate, here the plate 30, which is to be the inner plate at the joint, before the inner and outer plates are lapped to make the joint, and in preparation for securing the joint by use usually of a plurality of the fasteners suitably spaced along the joint.

In all the views 32 designates an opening through the joint provided by holes drilled through, or, rather, ordinarily punched through, the plates 30 and 31; this opening for allowing insertion of the stud-shank through the joint and toward and between the tong instrumentalities.

Figs. 1 through 4

Referring now in detail to the form of the invention here illustrated, there is shown a fastener which, in addition to the stud and tong elements aforesaid, includes a carrier plate 33. Such a carrier plate is from one standpoint an advantage because its use permits the tong elements to be preassembled before they are applied to the inner plate of the joint; but such a carrier plate is from another standpoint a disadvantage, because slightly increasing the cost of the fastener. It is now believed that the disadvantage of a carrier plate is greater than the advantage thereof, and hence such a plate is herein shown as a part only of the embodiment illustrated in Figs. 1 through 4, and one other embodiment, which, as below stated, may be considered as more properly a modification of the embodiment of Figs. 1 through 4.

In these just alluded to forms of the invention, however, the carrier plate has a further function, in that it includes an integral upstanding neck 34 which is slotted along its length and at opposite sides as indicated at 35, which slots receive and guide the tongs-proper 36 formed on spring members 37, so that each of these members 37 can be riveted in place merely at a single point and solely by means of the usual round-shank rivet and yet prevented from turning about the axis of such rivet. A rivet of this kind is shown at 38. In the present case, these rivets also serve to secure to the carrier a pair of auxiliary spring members 39.

The spring members 37 are formed from lengths of spring steel wire, or wire of other suitable resilient material (as beryllium-copper alloy); while the spring members are leaf-spring elements stamped from steel, said alloy or the like, and formed to carry integrally a pair of ears 40.

These tabs or ears 40, because they hold the leaf members 39 against turning relative to the wire members 37, lock said members 39 against turning on the rivets 38; since the reception of the tongs-proper 36 in the slots 35 of the carrier plate 33, coupled with the coaction between the wire members 37 and the rivets 38, prevents turning of these wire members on the rivets.

As here shown, both the wire members 37 are duplicates, but reversely placed on the carrier plate 33, and both the leaf members 39 are also duplicates, but reversely placed on the carrier plate; thereby to hold down the die and tool cost for the making of a fastener of a desired size and strength. The addition of the leaf members is desirable, because such members can be easily given a comparatively stiff normal resilient bias away from the joint plane, thereby to allow comparatively thin spring-wire stock to be used for the wire members 37, thereby in turn to allow use of a stud of very small shank diameter and so allow reduction of the size of the fastener at the exterior as well as at the interior of the joint—both these last important advantages in certain fields of use.

The wire members 37 are each shown as including convolutions at its end to be engaged by a rivet 38; such convolutions constituting a conical coil spring decreasing in diameter toward the joint plane so as to terminate adjacent the inner face of the inner plate 30 in an eye for embracing the shank of the rivet. This conical coil spring, or coil as it will be herein called, is marked 41; and is desirably present, whether or not it adds materially to the resilient means for holding the joint tightly closed after the fastener is closed to snap-lock condition, for participating, as below explained, in the means constituting the snap-lock.

For attaching the carrier plate 33 to the inner plate 30, after all parts of the fastener except the stud have been preassembled as shown and as already described, the plate 33 has a pair of holes 42 punched therethrough, for taking a pair of rivets 43 to be headed over into countersunk holes 44 through the inner plate 30.

The stud, marked generally 45, and having a kerfed head 46, is provided with a solid shank 47 having at opposite sides a pair of straight grooves 48, each of which is laterally enlarged at one side thereof, to establish recesses 49 of substantially triangular outline and curving around the stud shank for about one-quarter to one-third of the circumference of the latter. The top, overhanging and downwardly inclined wall 50 of each recess 49 provides an eave-like or undercut spirally descending ramp, whereby, following insertion of the stud as in Figs. 1 and 2, a fractional rotation of the stud, from the exterior of the joint, and by way of the kerfed head 46, results in bringing the lower ends of these ramps into engagement with the tongs-proper 36; thereby placing the spring members 37 and 38 under sufficient abnormal tension to close the joint tight.

If now the stud 45 can be held against casual retrograde movement in a rotative sense, the tight closure of the joint will be maintained. And such retrograde turning of the stud is automatically guaranteed, by means including the following parts:

The bottom walls 52 of the straight grooves 48 are inclined downwardly and outwardly relative to the axis of the stud. The normal resilient bias of the coils 41 are such that the tongs-proper 36, in the direction of their length, are urged to an extension such that the normal separation of their free ends is about equal to or somewhat less than the distance, diametrally of the stud, between the bottoms of recesses or latch-pockets 53 extended inwardly radially of the stud shank at points adjacent to the lower ends of the overhanging spiral ramps 50—these latch-pocket extensions 53 being aligned diametrally of the stud shank.

If the leaf members 39 are included, their spring bias can be relied on solely or principally for holding the joint closed tight. If the leaf members 39 are omitted, the coils 41 of the wire members 37 can be relied on not only for the purpose last mentioned, but also for causing latch-lock engagement between the tongs-proper and the pockets 53 as described in the paragraph immediately preceding.

A feature of the invention is a relation of the parts such that the stud can always be inserted through the opening 32 through the joint, without preliminary fumbling or "feeling" so as to have the female elements of the stud properly initially engage the tongs-proper 36. With the straight grooves 48 at diametrally opposite locations along the length of the stud shank, such diameter is here shown as at right angles to the line of extension of the kerf in the head 46 of the stud. In such case, all that is necessary to insure instant proper engagement of the tongs-proper 36 with the grooves 48 of the stud shank is to have said kerf at right angles to the direction of extension of the joint when inserting the stud.

Figure 5:
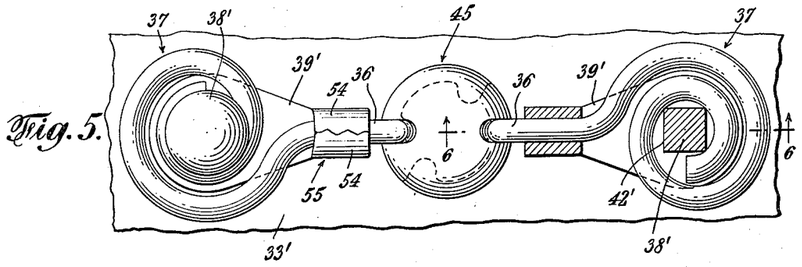
Fig. 5, showing another embodiment, is a view similar to Fig. 1, but with certain parts, duplicates of parts shown in top plan at the left of the view, shown in horizontal section at the right of the view.
Figure 6:
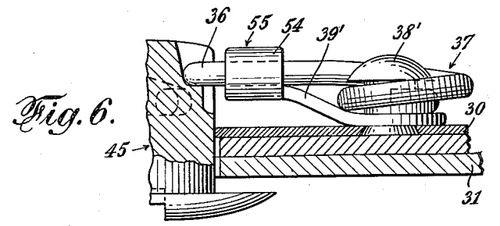
Fig. 6 is a section, taken on the line 6—6 of Fig. 5.

Figs. 5 and 6

Referring next in detail to the form of the invention shown in these views, which structure is really more of a modification of, rather than a distinctly different embodiment from, the structure of Figs. 1 through 4, a carrier plate is fragmentarily indicated at 33, the leaf members are formed as indicated at 39'; and the same wire members 37 and the same stud 45 are shown. According to this arrangement, a more inexpensive carrier plate is provided than the plate 33, in that the neck 34 of the latter is omitted; while, in order to prevent turning of any member 37 or 39' about the axis of the single rivet used to secure each of the two pairs of members 37 and 39' to the plate 33', such rivet marked 38', the shanks of these rivets are keyed as it were to the plate 33', and the members 37 and 39' of each pair thereof are interengaged as in Figs. 1 through 4 to prevent movement of either relative to the other about the axis of their mounting rivet. Such keying is here shown as being done by providing the rivets 38' with square shanks, and by making square the rivet-receiving holes 42' through the inner joint plate 30. As will be understood, such holes can be made of any other shape than round as easily and cheaply as when made round, because they are usually punched, not drilled; and hence no broaching operations are required.

In the structure of Figs. 5 and 6 now being described, the leaf members could be exactly like the members 39 of Figs. 1 through 4, but what is now believed a desirable variation is that shown in the former views; since this tends to stiffen and fortify the tongs-proper 36. Here, instead of ears or tabs 40, each leaf member 39' at its tong engaging end, is provided with a pair of lateral extensions 54 so dimensioned and proportioned that they can be curled up toward each other to form a strong and rigid collar 55 embracing a considerable length of the associated wire member 37 contiguous to the free end of the tong-proper 36 of that wire member.

Figure 7:
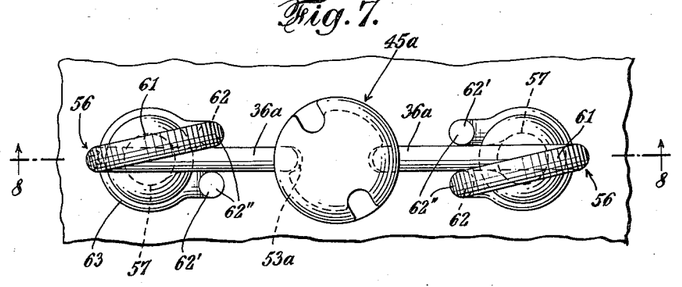
Fig. 7, showing another embodiment, is a view similar to Fig. 1, but showing the stud rotated and the fastener locked closed.
Figure 8:
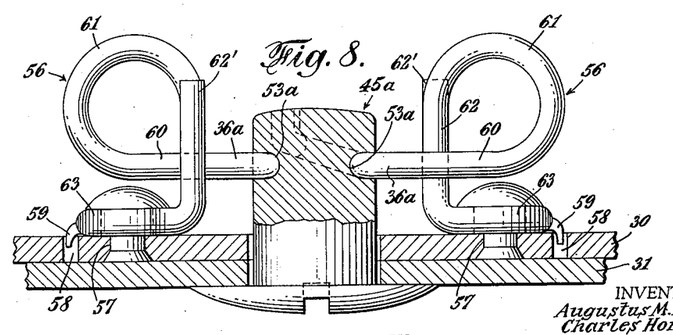
Fig. 8 is a section, taken substantially on the line 8—8 of Fig. 7.

Figs. 7 and 8

Referring next in detail to the embodiment shown in these views, it will be noted that a carrier plate is dispensed with; the stud 45a is exactly like the stud 45 of Fig. 1, except that the length of its shank, between the grooves in the latter and the head of the stud, is somewhat longer than that of the stud 45; leaf spring members are dispensed with; and the pair of wire spring members, marked 56, are duplicates, but reversely arranged. In order to prevent turning of these last-named members, and yet use ordinary round-shank rivets to secure them to the inner joint plate 30, there is provided, in regard to each member 56, not only a round hole 57 for its said rivet, but also a smaller round hole 58. Each small hole 58 is for receiving a barb or prong 59 struck from the round wire stock of which the adjacent wire member 56 is formed.

In order clearly to understand the shape and functioning of each wire member 56, it will suffice to describe one thereof. Starting with a horizontally extending length 60 of which member which establishes the tong-proper 36a thereof, there is next a vertically disposed, helically bent portion 61, next a vertically descending straight limb 62, next a horizontally curvilinearly bent portion 63 for establishing a nearly closed eye for taking the rivet shank, from which eye the barb or prong 59 is formed, and finally a vertically upstanding straight limb 62'. Said portion 61 will hereinafter be called the spring helix; and said limbs 62 and 62' will hereinafter be called the steady-cradle 62" for the tong-proper 36a.

This steady-cradle insures a stiff and strongly held tong-proper, while the relation of the spring helix 61 to the other parts provides a means acting resiliently not only to snap-lock the tongs-proper 36a into the stud pockets 53a when the joint plates 30 and 31 are drawn together by fractional rotation of the stud, but also to hold the thus made joint tightly closed.

Figure 9:
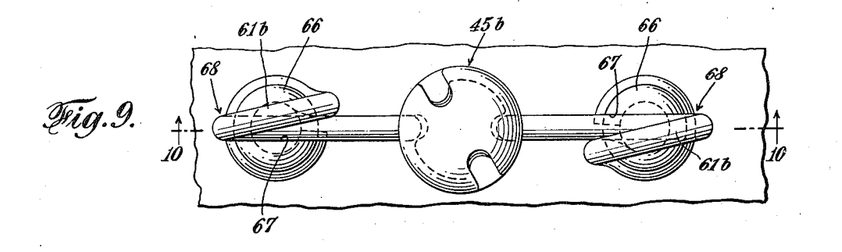
Fig. 9, showing another embodiment, is a view similar to Fig. 7.
Figure 10:
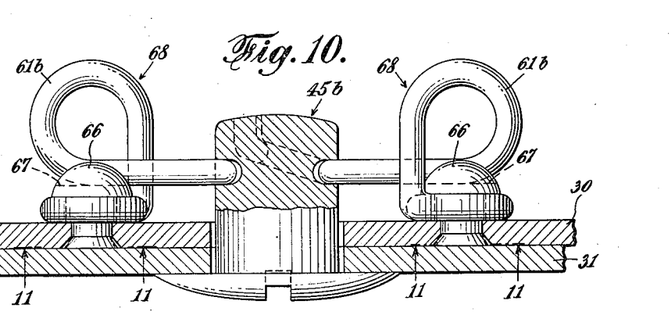
Fig. 10 is a section, taken substantially on the line 10—10 of Fig. 9.
Figure 11:
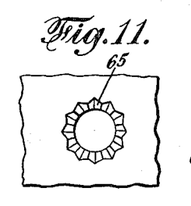
Fig. 11 is a section, taken substantially on either of the lines 11—11 of Fig. 10.

Figs. 9 through 11

Referring next in detail to the structure here shown, this is similar to the embodiment last described, except that the barb or prong 59 is dispensed with, but, instead, the inner joint plate 30 is provided with a serrated hole as indicated at 65 for receiving the rivet for attaching a wire spring member to the inner plate 30; said rivet, a round-head one, marked 66, has its head diametrally slotted at 67; and the wire member, marked 68, lacks the upstanding limb 62' of the embodiment just previously described; and the bottom of the spring helix 61b rests in the slot 67 of the rivet 66. By virtue of this relation of the parts, the wire spring member cannot turn relative to the rivet; while, once the shank of the rivet is headed over relative to the serrated hole 65, the rivet cannot turn relative to the inner joint plate 30. The stud, 45b, is, as to the grooves carried by its solid shank, exactly like the studs above described.

Figure 12:
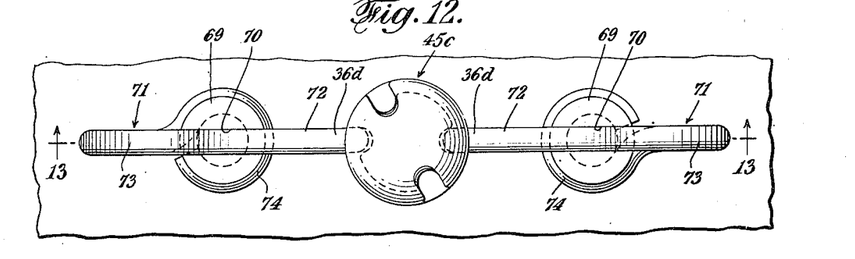
Fig. 12, showing another embodiment, is a view similar to Fig. 7.
Figure 13:
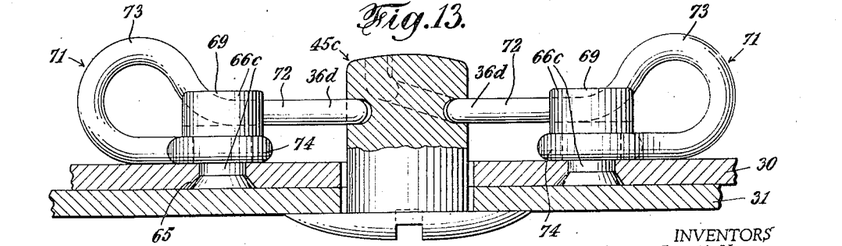
Fig. 13 is a section, taken substantially on the line 13—13 of Fig. 12.
Figure 14:
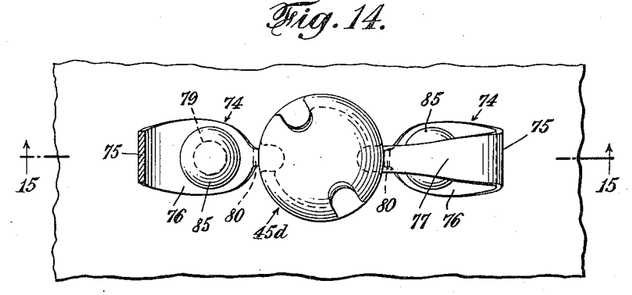
Fig. 14, showing another embodiment, is in part a view similar to Fig. 1, and in part a section taken on the line 14—14 of Fig. 15.

Figs. 12 and 13

Referring next in detail to the fastener here shown, this carries the idea of the structure last above described a step further toward providing a somewhat simplified and cheapened, and much smaller, yet highly strong and dependable, fastener, as compared to any of those so far described herein.

The stud 45c, also with its grooves exactly like those of the studs already described, is of a length as short as or even shorter than that of any of the previously discussed studs.

The same serrated hole 65 is shown as used for the ordinary round-shank rivet to attach a wire spring member to the inner joint plate 30. Such rivet, marked 66c, is, however, shaped to include a fairly massive philister head 69, interrupted diametrally by a long and deep slot 70. The spring wire members, here again, are duplicates, but reversely arranged. Each such member, marked generally 71, is made up of a straight terminal length 72, carrying at its free end the tong-proper 36d, next a looped portion 73 forming an almost completely closed, vertically disposed eye, and, finally, a substantially or fully closed horizontally disposed eye 74 for taking the rivet shank. A considerable stretch of the terminal straight length 72 of the member 71, and also an adjacent part of the loop 73, are seated in the slot 70. The loop 73, or spring means proper, acts normally, as will now be understood, to urge the tong-proper 36d not only away from the joint but also in toward the axis of the opening 32 through the joint plates 30 and 31.

Figs. 14 through 18

Figure 15:
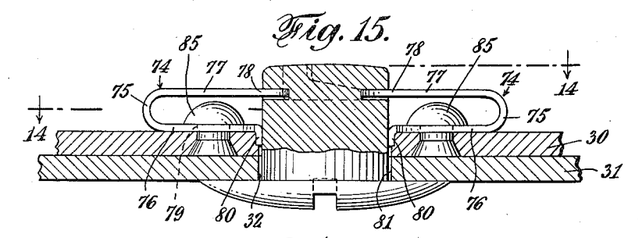
Fig. 15 is a section, taken substantially on the line 15—15 of Fig. 14.
Figure 16:
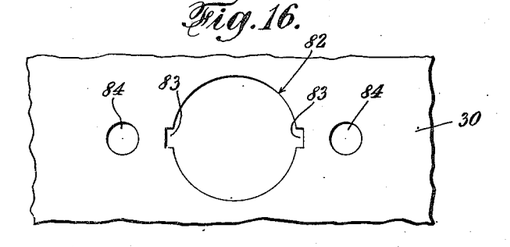
Fig. 16 is a view looking down, as in Fig. 14 on the inner side of the inner joint plate, merely showing the holes punched in the latter.
Figure 17:
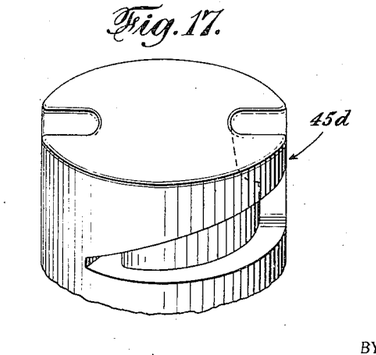
Fig. 17 shows the stud of Figs. 14 and 15 in side elevation.
Figure 18:
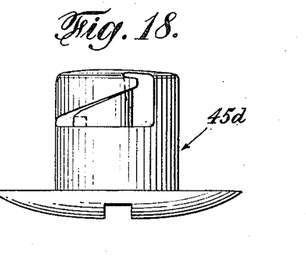
Fig. 18 is an enlarged perspective view of the grooved portion of the shank of said stud.

Referring next in detail to the fastener here shown, the same includes a stud 45d constructed along the same principles as those according to which the studs already described are made. The resilient elements are leaf-spring members 74, but employed alone, that is, without spring wire members such as used in the fasteners previously described. The spring members 74, here again, are duplicates, but reversely arranged. Each such member is in the main in the shape of a lazy U, having a bowl 75, a lower limb 76 carrying means whereby the member may be secured easily and simply to the inner joint plate 30 in a way to prevent turning of the member about the rivet for securing the same to said plate; and an upper limb 77 shaped at its free end to provide a tong-proper 78. The means last referred to comprise a round hole 79 in the limb 76, and a tongue 80 struck downward from said limb so as arcuately to extend across the free end of the limb and to have a height slightly less or no greater than the thickness of the inner joint plate 30. As to the opening through the lapped joint plates 30 and 31, corresponding to the opening 32 described in connection with the embodiments already discussed, although it can include a round hole 81 in the outer joint plate 31, it includes an opening in the inner joint plate 30 which is of the outline shown most clearly at 82 in Fig. 16. This opening 82, it will be noted, includes a pair of diametrically opposite extensions 83, each for having seated therein a tongue 80 of one of the spring members 74. For mounting the resilient means of each fastener at the inner face of the inner joint plate 30, such plate is punched in three places, to provide the hole 82 and two rivet holes 84. The holes 79 in the limbs 76 of the spring members 74 match the holes 84 in the plate 30, and the latter holes are so spaced, relative to the location of the hole 82 and the dimensions of the spring member 74, that when the shank of a rivet 85 is sent through the hole 79 of a member 74 and through a hole 84 of the plate 30, with the tongue 80 of said member 74 in the pocket provided by an extension 83 from the hole 82 in said plate, and the free end of the rivet shank is headed over as shown in Fig. 15, the tongue 80 of the member 74 acts as a key to prevent turning of said member on the rivet and provides a smooth continuation of the arcuate portions of the hole 82 which extend between the extensions 83 from said hole.

The operation of this fastener, for latch-locking the joint closed, and for simultaneously resiliently tightening up the joint, should be understood, from the construction of this fastener as just described, and from the generally similar mode of operation of the fasteners previously described.

Figs. 19 through 22

Referring next in detail to the fastener here shown, the same is rather a modification of the embodiment last described. For the resilient means to be preparatorily secured to the inner joint plate 30 at its inner face, two leaf-spring members 86 merely are employed. These generally are of the type shown in Figs. 14 through 18; except that it may be pointed out that in the present case each spring member 86 has its tong proper 87 formed by a re-entrant bend at the free end of the upper limb of said member, the tong carried by the lower limb of said member, this tong, here marked 88, is of greater dimension circumferentially of the stud-receiving opening in the plate 30 than the tongue 80 of a spring member 74, and the riveting means for securing a spring member 86 to the plate 30 is integrally carried by the lower limb of said member, as indicated at 89.

Figure 19:
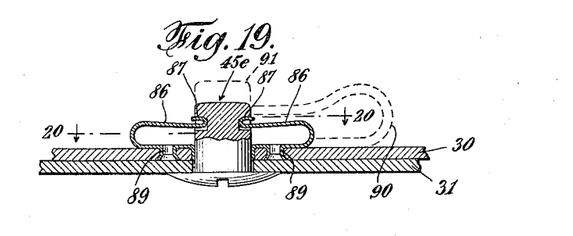
Fig. 19, showing in full lines another embodiment, is a view similar to Fig. 2 but drawn to a scale half that of Fig. 2; the diagrammatic broken-line delineation whereof (and of Fig. 20) will be hereinafter explained.
Figure 20:
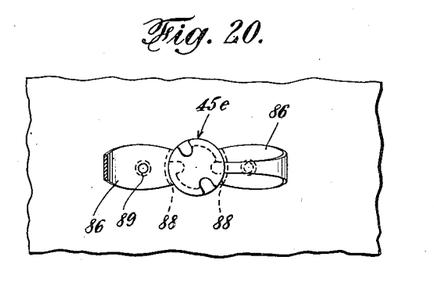
Fig. 20 is, in full lines, a section, taken substantially on the line 20—20 of Fig. 19.
Figure 21:
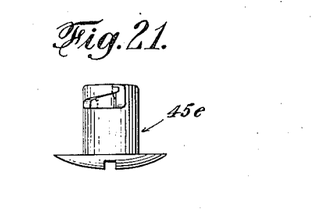
Fig. 21 is a view similar to Fig. 17, but showing the stud of Figs. 18 and 19.
Figure 22:
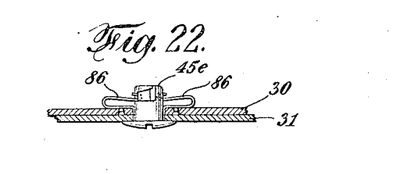
Fig. 22 is a side elevation of the fastener of Figs. 19 through 21, but drawn to a scale half that of Figs. 18 and 19, and hence one-quarter that of Fig. 1.

As has already been pointed out, the scale to which Figs. 19, 20 and 21 has been drawn is one-half that of the scale to which the other views have been drawn, or, in other words, the scale of Figs. 19, 20 and 21 is twice that of the actual fastener when made of the size commonly employed in aircraft construction.

It will be noted that, even allowing for the differences in scale of the drawings as between Figs. 19, 20 and 21, and the other views described, the stud 45e of Figs. 19, 20 and 21 is shown as very much smaller, both as to length and diameter of shank, than studs illustrated in connection with the other fasteners. This is to bring out the possibilities of the invention, in providing a very small yet rugged fastener, by the aid of a fairly recently developed alloy having a remarkably high resiliency factor of 900 as compared to the same factor of 100 for ordinary spring steel, and of 200 for even vanadium steel or other very expensive special spring steel. An attempt graphically to illustrate the point just made is embodied in the broken-line showings of Fig. 19. Here the delineation 90 shows the diameter of spring wire and the space which would be taken up at the inner side of the joint by a spring member made of such wire and shaped according to the embodiment of Figs. 12 and 13, were such member made of spring steel and were it desired to provide a fastener as strong and dependable and as efficient in resiliently closing the joint as the fastener shown in full lines in Figs. 19, 20 and 21; while the delineation 91 shows the length and girth of the shank which the stud would have to incorporate.

Other variations and modifications come within the invention, and parts of the improvements may be used without others.

We claim:

1. In a fastener, the combination of a resilient means for securement to a part having a hole therethrough and to be coupled by the fastener to another part, said resilient means including a pair of resilient structures each incorporating a tong member having a free end which acts as one of two tongs-proper; positioning means for said resilient structures and including portions thereof whereby they are securable to said first-named part in placements thereon such that said tongs-proper face each other in spaced relation adjacent to said opening; and a headed stud having a shank insertable through said hole, said shank having external recesses in the form of channels, two of which channels, spaced around said shank substantially 180° apart, start from the free end of the shank and extend down along the same in substantial parallellism with the center-line of the shank to act as interceptors for the tongs-proper on inserting the shank through said hole, and two others of which channels, each laterally offset from a different one of the first-named channels at a point below the free end of the shank, are so shaped that following interception of the tongs-proper by the first-named channels, fractional rotation of the stud forces the tongs-proper down along said shank to locations abnormally close to the head of the stud, said recesses also including two pockets spaced around the shank substantially 180° apart and having their direction of depth substantially radial to the stud-axis, one of said pockets at each of said locations, whereby on fractional rotation of the stud as aforesaid the tongs-proper snap into said pockets to interlock therewith and to prevent accidental retrograde turning of the stud, said resilient structures being so shaped and tensioned that when secured to said first-named part as aforesaid said tongs-proper are normally resiliently urged to a lesser degree of separation than the diameter of said shank less the sum of the depths of the two first-named channels near the lower ends of the latter, and also to a lesser degree of separation than the diameter of said shank less the sum of the depths of the two second-named channels at their ends adjacent to said pockets.

2. A fastener as in claim 1, in which the two channels first-named are of less depth near the upper or free end of said stud shank than near their lower ends.

3. A fastener as in claim 1, in which each of the second-named channels has an upper undercut wall running around and at the same time running down along the shank.

4. A fastener as in claim 1, in which each of the second-named channels is partially formed by an undercut ramp running spirally down around said stud shank.

5. A fastener as in claim 1, in which one of said resilient structures includes a leaf-spring member having an aperture, and a wire-spring member one terminal length of which constitutes one of said tong-members and the other terminal length of which is bent to a substantially circularly curved loop so extended as to define more than a semi-circle; in which said positioning means includes a rivet the shank of which passes through said aperture and said loop; in which said leaf-spring member and said wire-spring member carry inter-engaging parts to prevent either of said members from turning relative to the other about the rivet axis; and in which other means are provided for preventing turning movement of said two members in unison about the axis of the rivet.

6. A fastener as in claim 1, in which one of said resilient structures includes a leaf-spring member having an aperture, and a wire-spring member one terminal length of which constitutes one of said tong-members and the other terminal length of which is bent to a substantially circularly curved loop so extended as to define more than a semi-circle; in which said positioning means includes a rivet the shank of which passes through said aperture and said loop; in which said leaf-spring member and said wire-spring member carry inter-engaging parts to prevent either of said members from turning relative to the other about the rivet axis; and in which other means are provided for preventing turning movement of said members in unison about said axis, said other means including means fixed on said part first-named and engaging the tong-member last-named.

7. A fastener as in claim 1, in which one of said resilient structures includes a wire-spring unit one terminal length of which constitutes one of said tong-members and the other terminal length of which is spirally downwardly inwardly coiled, to provide a conical expansile spring of less diameter at its lower end than at its upper end, at which lower end said unit is bent to provide a substantially closed eye; and in which said positioning means includes a rivet the shank of which passes through said eye and through said first-named part, the latter having a hole therethrough for taking said rivet shank.

8. A fastener as in claim 1, in which one of said resilient structures comprises a wire-spring member having an intermediate length bent to include a generally vertically disposed loop resiliently biased to urge the tong-member of that structure toward the center of the hole of said first-named part and also to urge said tong-proper of that structure away from said first-named part.

9. A fastener as in claim 1, in which one of said resilient structures comprises a wire-spring unit one terminal length of which constitutes the tong-member of that structure and the other terminal length of which is bent to provide a substantially closed eye, said wire-spring also having an intermediate length bent to include a generally vertically disposed loop resiliently biased to urge the tong-member of that structure toward the center of the first-named hole of said first-named part and also to urge said tong-proper of that structure away from said first-named part; and in which said positioning means includes a rivet the shank of which passes through said eye and through said first-named part, the latter having a hole therethrough for taking said rivet shank.

10. A fastener as in claim 1, in which one of said resilient structures comprises a wire-spring unit one terminal length of which constitutes the tong-member of that structure and the other terminal length of which is bent to provide a substantially closed eye, said wire-spring member also having an intermediate length bent to include a generally vertically disposed loop resiliently biased to urge the tong-member of that structure toward the center of the first-named hole of said first-named part and also to urge said tong-proper away from said first-named part; in which said positioning means includes a rivet the shank of which passes through said eye and through said first-named part, the latter having a hole therethrough for taking said rivet shank; and in which a means is provided for preventing rotational movement of said spring-wire member about the axis of said rivet shank.

11. A fastener as in claim 1, in which one of said resilient structures comprises a substantially C-shaped leaf-spring unit one terminal length of which constitutes one of said tong-members and the other terminal length of which is shaped to include an element forming part of said positioning means.

12. A fastener as in claim 1, in which one of said resilient structures comprises a substantially C-shaped leaf-spring unit having one terminal length constituting the tong-member of that structure and having its other terminal length provided with a projection struck therefrom and forming part of said position means.

13. In a fastener, the combination of a resilient means for securement to a part having a hole therethrough and to be coupled by the fastener to another part, said resilient means including a pair of resilient structures each incorporating a tong member having a free end which acts as one of two tongs-proper; positioning means for said resilient structures, whereby they are securable to said first-named part in placements thereon such that said tongs-proper face each other in spaced relation adjacent to said opening; and a headed stud having a shank insertable through said hole, said shank having external recesses including a plurality of channels spaced around said shank substantially 180° apart, each starting from near the free end of the shank and extending down along and around the same toward the head of the stud, the upper ends of said channels being open to adapt the upper portions of said channels to act as interceptors for the tongs-proper on inserting said shank through said hole, and portions of said channels below said open ends being shaped to act like screw-threads so that following interception of the tongs-proper by the first-named channel portions fractional rotation of the stud forces the tongs-proper down along said shank to locations abnormally close to the head of the stud, said recesses also including two pockets spaced around the shank substantially 180° apart and having their direction of depth substantially radial to the stud-axis, one of said pockets at each of said locations, whereby on fractional rotation of the stud as aforesaid the tongs-proper snap into said pockets to interlock therewith and to prevent accidental retrograde turning of the stud, said resilient structures being so shaped and tensioned that when secured to said first-named part as aforesaid, said tongs-proper are normally resiliently urged to a lesser degree of separation than the diameter of said shank less the sum of the depths of the two first-mentioned channel portions, and also to a lesser degree of separation than the diameter of said shank less the sum of the depths of the two second-named channel portions at their ends adjacent to said pockets.

14. In a quick detachable fastener for securing together two members with a portion of one of said members overlapping a portion of the other, said fastener being of the type including a resilient means carried by one of said members adjacent to a hole therethrough substantially matching a hole through the other of said members, the combination of such a resilient means, the same including a pair of resiliently acting tong-legs having free ends for acting as tongs-proper for locking coaction with a cooperant fastener element of the fractionally rotatable stud type, said resilient means also including supports for the root ends of said tong-legs, said supports including means for securing said resilient means to said member first-named thereby to mount the tong-legs relative to said first-named member with the free ends of said tongs-proper normally positioned overlappingly of said first-named hole with said tong-legs approaching said hole from different directions; and a cooperant fractionally rotatable stud including a shank having a pair of external recesses therein, each of said recesses including a channel starting at one of its ends near one end of said shank and thence running around and along the length of said shank and each recess also including a pocket near the end of said channel other than the end thereof first-named, said pocket extended in toward the axis of said shank to a depth greater than that of said channel at a portion of the latter immediately approaching said pocket, as to each pair of said tong-legs and said supports both these parts being so shaped and there being a resiliently deformable means included in said pair whereby, when said supports are secured to said first-named part as aforesaid, the free ends of said tongs-proper are normally resiliently urged to overlap said hole first-named to a predetermined extent to insure that the spacing of the free ends of said tongs-proper from the usual locus of the axis of said stud when in fastening position is so increased by a movement of the stud relative to said resilient means always having to be performed for locking the fastener as to tension the resilient means by forcing said tongs-proper to a greater spacing from said axis and by holding said tongs-proper to said greater spacing during turning of the stud for relative movement between the tongs-proper and the channel portions last-named.

15. A fastener as in claim 14, in which each of said tong-legs at or near the root end thereof is bent down and toward and then along the portion of said first-named member near said first-named hole, to provide adjacent to the root end of said tong-leg a mounting for its tong-proper of greater resiliency than elsewhere along said tong-leg.

16. A fastener as in claim 14, in which each of said tong-legs at or near the root end thereof is beat down and toward said first-named member to resiliently space its tong-proper away from said member, said tong-leg being in part formed of a leaf-spring element having the bend aforesaid therein, its said tong-proper being a length of metal wire projected beyond said leaf-spring element, there also being means including means carried by said leaf-spring element for mounting said wire against shift on said leaf-spring element.

17. In a quick detachable fastener for securing together two members with a portion of one of said members overlapping a portion of the other, said fastener being of the type including a resilient means carried by one of said members adjacent to a hole therethrough substantially matching a hole through the other of said members, the combination of such a resilient means, the same including a pair of resiliently acting tong-legs having free ends for acting as tongs-proper for locking coaction with a cooperant fastener element of the fractionally rotatable stud type, said resilient means also including supports for the root ends of said tong-legs, said supports including means for securing said resilient means to said member first-named thereby to mount the tong-legs relative to said first-named member with the free ends of said tongs-proper normally positioned overlappingly of said first-named hole with said tong-legs approaching said hole from different directions; and a cooperant fractionally rotatable stud including a shank having external shapings therealong, said shapings including a pair of channels each starting at one of its ends at one end of the shank and thence running girthwisely and lengthwisely of said shank, said shapings further including impositive detent elements for said tongs-proper adjoining the other ends of said channels, and said shapings further including a wall receding from the stud axis as said wall extends toward the last-named channel ends, whereby, as the result of insertion and rotation of the stud in fastening direction, said tong-legs are placed under greater tension than normal, thereby to insure snap-latching of said tongs-proper into said detents during the last performed portion of said stud rotation.

18. In a quick detachable fastener for securing together two members with a portion of one of said members overlapping a portion of the other, said fastener being of the type including a resilient means carried by one of said members adjacent to a hole therethrough substantially matching a hole through the other of said members, the combination of such a resilient means, the same including a pair of resiliently acting tong-legs having free ends for acting as tongs-proper for locking coaction with a cooperant fastener element of the fractionally rotatable stud type, said resilient means also including supports for the root ends of said tong-legs, said supports including means for securing said resilient means to said member first-named thereby to mount the tong-legs relative to said first-named member with the free ends of said tongs-proper normally positioned overlappingly of said first-named hole with said tong-legs approaching said hole from different directions; and a cooperant fractionally rotatable stud including a shank having a pair of external recesses therein, each of said recesses including a channel extending around and along the length of the shank, each of said channels including a detent portion of greater depth than a channel portion adjacent thereto for impositively holding the stud against casual rotation in unfastening direction when said tongs-proper are entered into said detent portions, at least one of said channels including a portion more remote from its detent portion than its channel-portion second-named, for placing at least one tong-leg under abnormal tension during movement of the stud to axially advance the stud relative to said resilient means.

19. In a quick detachable fastener for securing together two members with a portion of one of said members overlapping a portion of the other, said fastener being of the type including a resilient means carried by one of said members adjacent to a hole therethrough substantially matching a hole through the other of said members, the combination of such a resilient means, the same including a pair of resiliently acting tong-legs having free ends for acting as tongs-proper for locking coaction with a cooperant fastener element of the fractionally rotatable stud type, said resilient means also including supports for the root ends of said tong-legs, said supports including means for securing said resilient means to said member first-named thereby to mount the tong-legs relative to said first-named member with the free ends of said tongs-proper normally positioned overlappingly of said first-named hole with said tong-legs approaching said hole from different directions; and a cooperant fractionally rotatable stud including a shank having recesses therein, each of said recesses including a channel extending around and along the length of said shank, each channel including a portion of greater depth than a channel portion adjacent thereto so that the former channel portions act as pockets to impositively detain said tongs-proper to hold the fastener in fastening condition, said tong-legs being so resiliently biased and said channels ahead of said pockets being so formed on the stud that, incidental to rotation of the stud after first co-engagement of said tongs-proper with said channels and during subsequent relative movement between the stud and the tongs-proper, said tong-legs are forced to a greater degree of separation than normal, thereby to place them under such abnormal tension on arrival of said pockets and tongs-proper at matching locations that the tongs-proper snap into said pockets by relief of said abnormal tension.

20. A fastener as in claim 14, in which means are provided for limiting the resilient yield of said tong-legs to directions toward said hole first-named and to lines of movement substantially lengthwise of said tong-legs.

21. A fastener as in claim 14, in which means are provided for limiting the resilient yield of said tong-legs mainly to directions toward and away from said hole first-named.

22. In a quick detachable fastener for securing together two members with a portion of one of said members overlapping a portion of the other, said fastener being of the type including a resilient means carried by one of said members adjacent to a hole therethrough substantially matching a hole through the other of said members, the combination of such a resilient means, the same including a plurality of spring elements and a plurality of elongate claw-elements having ends for acting as claws-proper for locking coaction with a cooperant fastener element of the fractionally rotatable stud type, said resilient means also including supports for said claw-elements, said supports including means for securing said resilient means to said member first-named thereby to mount said claw-elements relative to said first-named member with the said claws-proper normally positioned overlappingly of said first-named hole with said claw-elements lengthwise approaching said hole from different directions; and a cooperant fractionally rotatable stud including a shank having external shapings therealong, said shapings including a pair of channels each starting at one of its ends at one end of the shank and thence running girthwisely and lengthwisely of said shank, said shapings further including impositive detent elements for said claws-proper adjoining the other ends of said channels, and said shapings further including a wall receding from the stud axis as said wall extends toward the last-named channel ends, whereby, incidental to insertion and rotation of the stud in fastening direction, said claws-proper are forced to an abnormal spacing one from another, and said spring elements, as the result of movement of said claw-elements accompanying abnormal spacing of said claws-proper, being abnormally tensioned, thereby to insure snap-latching of said claws-proper into said detents during the last performed portion of said stud rotation.

AUGUSTUS M. HENRY.
CHARLES HORTON.